Feb. 14, 1956　　　G. S. KNOX　　　2,734,715
SPHERICAL VALVE
Filed Dec. 22, 1952　　　6 Sheets-Sheet 1
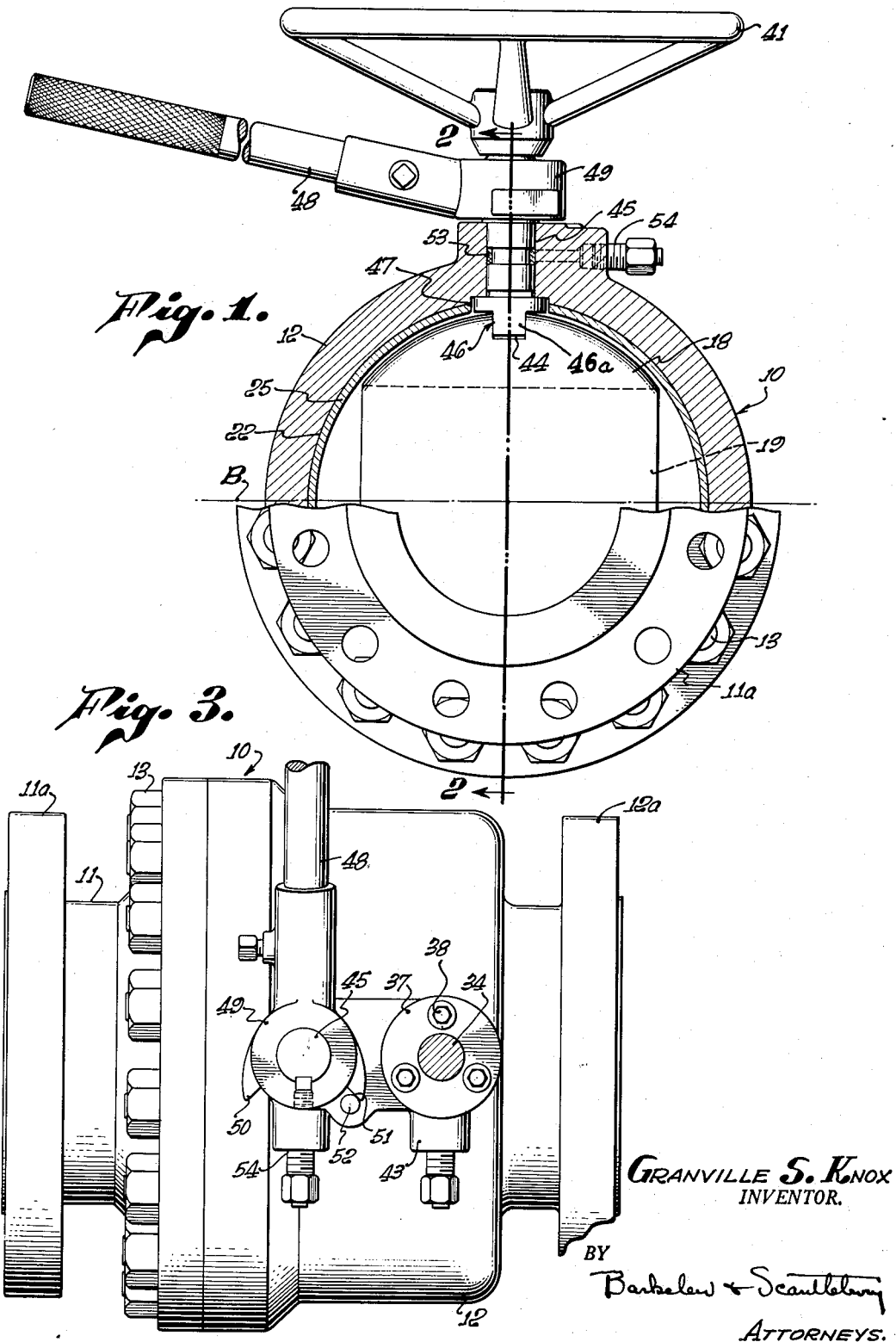
GRANVILLE S. KNOX
INVENTOR.
BY
Barkelew & Scantlebury
ATTORNEYS.

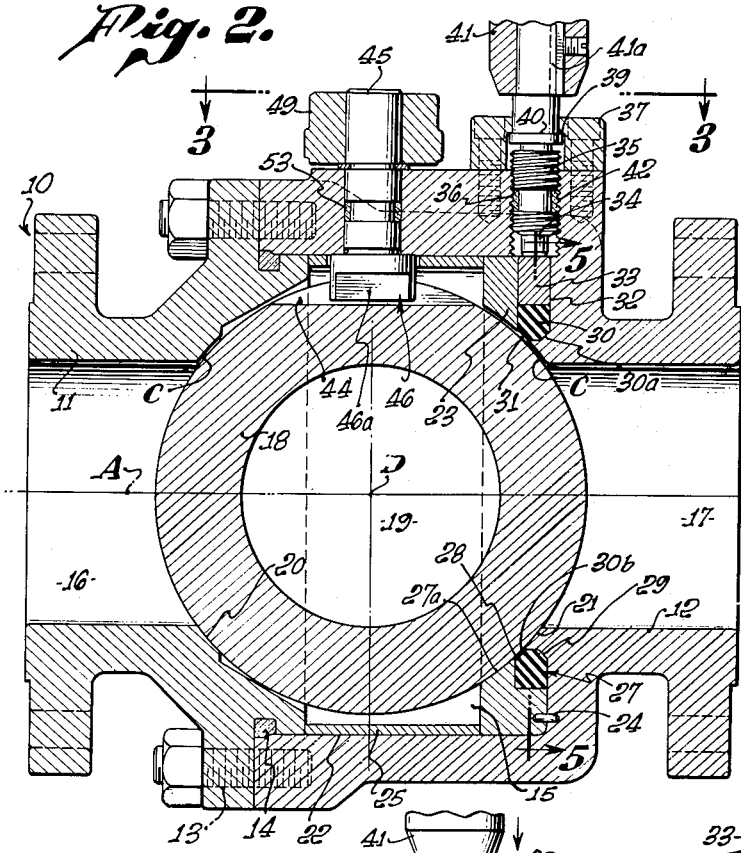
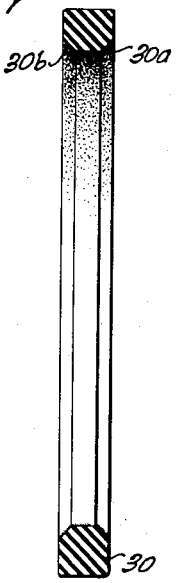
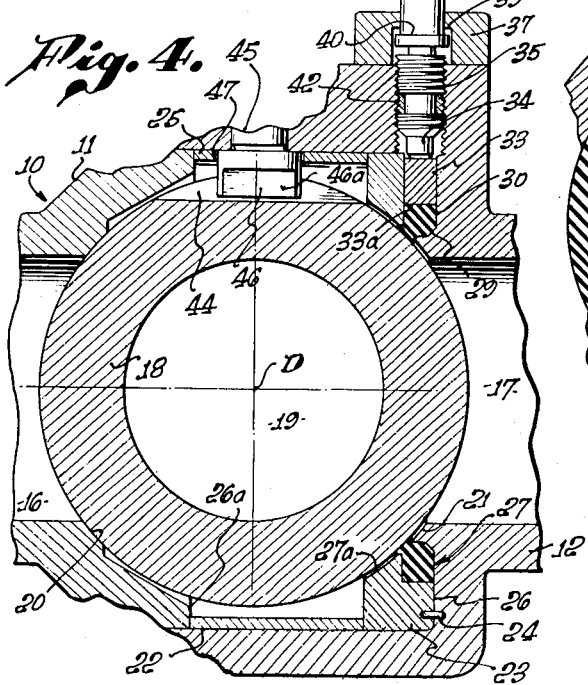
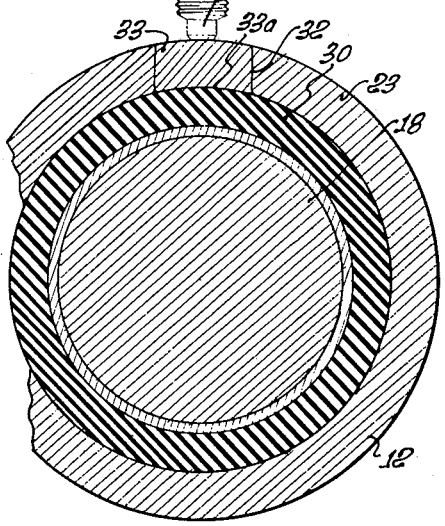
Granville S. Knox, INVENTOR.

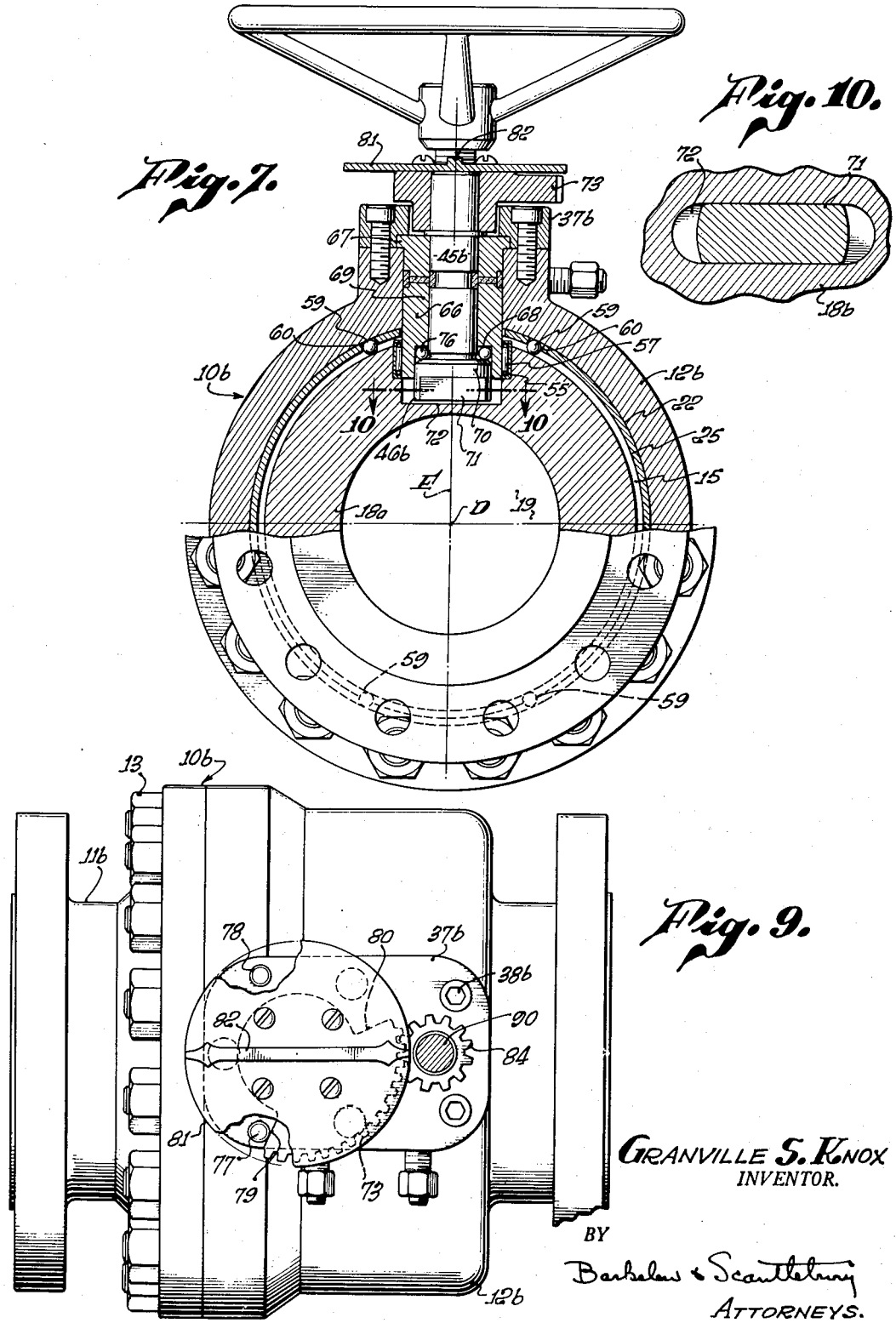

Feb. 14, 1956
G. S. KNOX
2,734,715
SPHERICAL VALVE
Filed Dec. 22, 1952
6 Sheets-Sheet 4
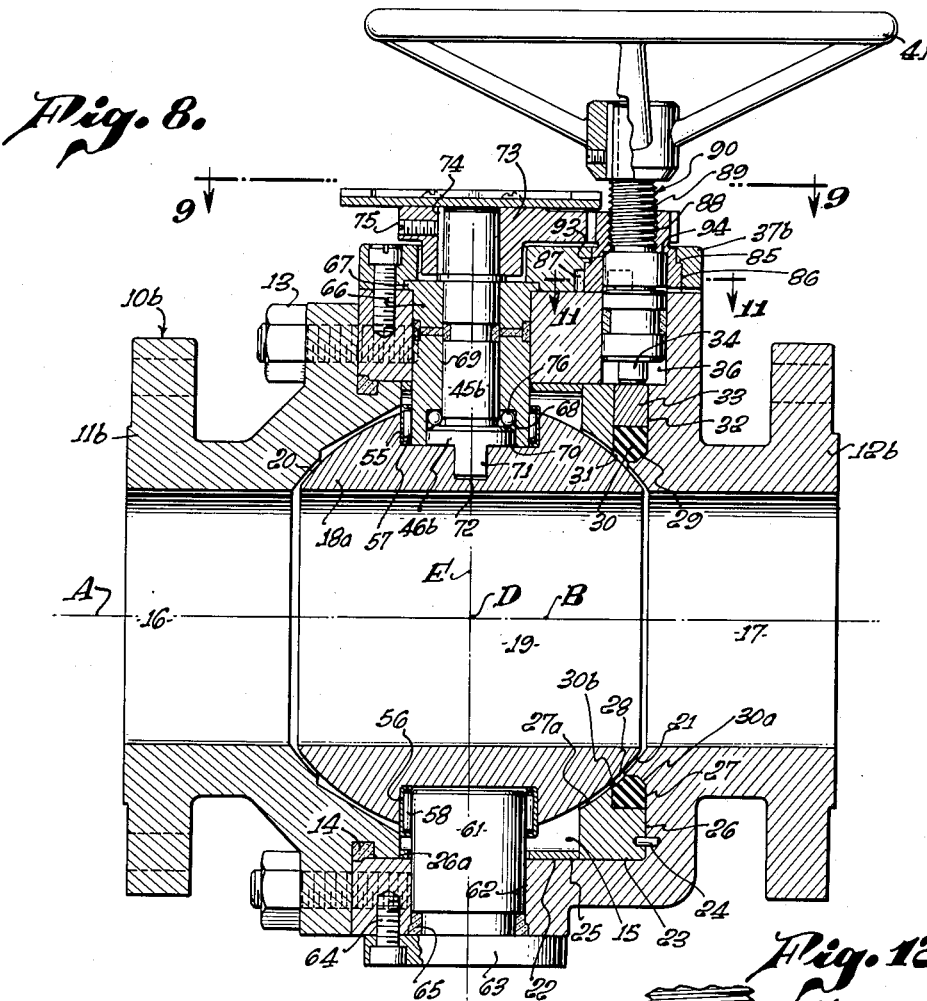
Fig. 8.
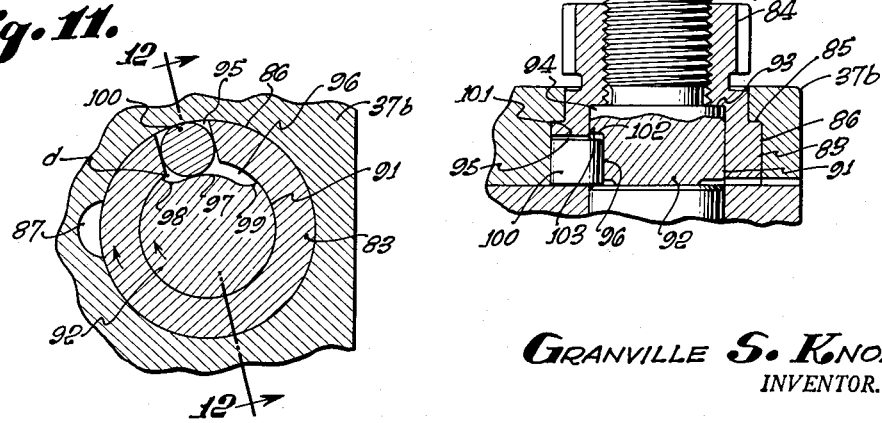
Fig. 11.
Fig. 12.
GRANVILLE S. KNOX,
INVENTOR.
BY
Barkalow & Scantlebury
ATTORNEYS.

Feb. 14, 1956 G. S. KNOX 2,734,715
SPHERICAL VALVE
Filed Dec. 22, 1952 6 Sheets-Sheet 5
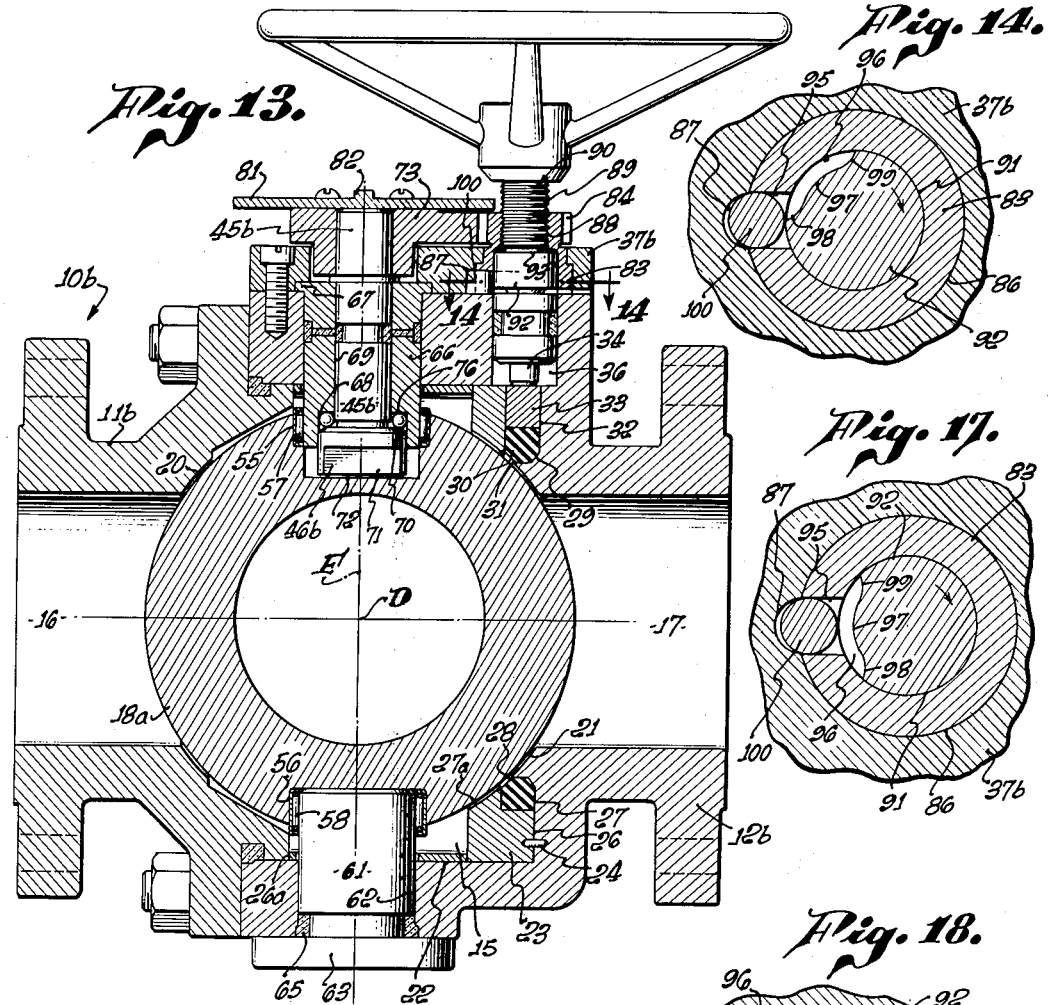
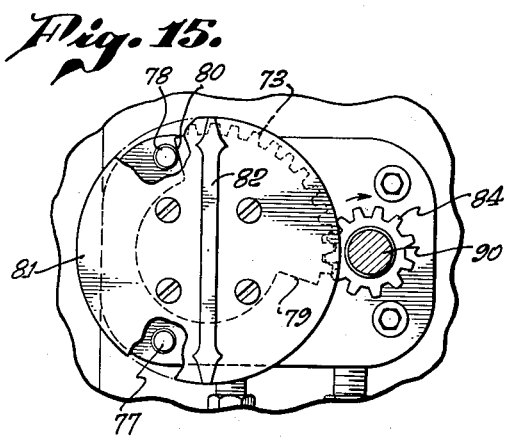
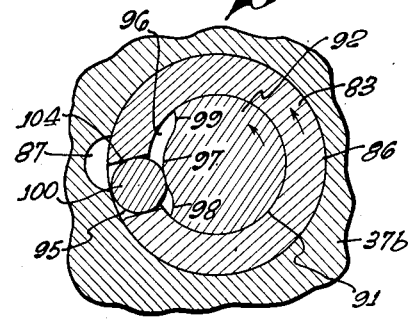
GRANVILLE S. KNOX,
INVENTOR.
BY
Barkelew & Scarlton
ATTORNEYS.

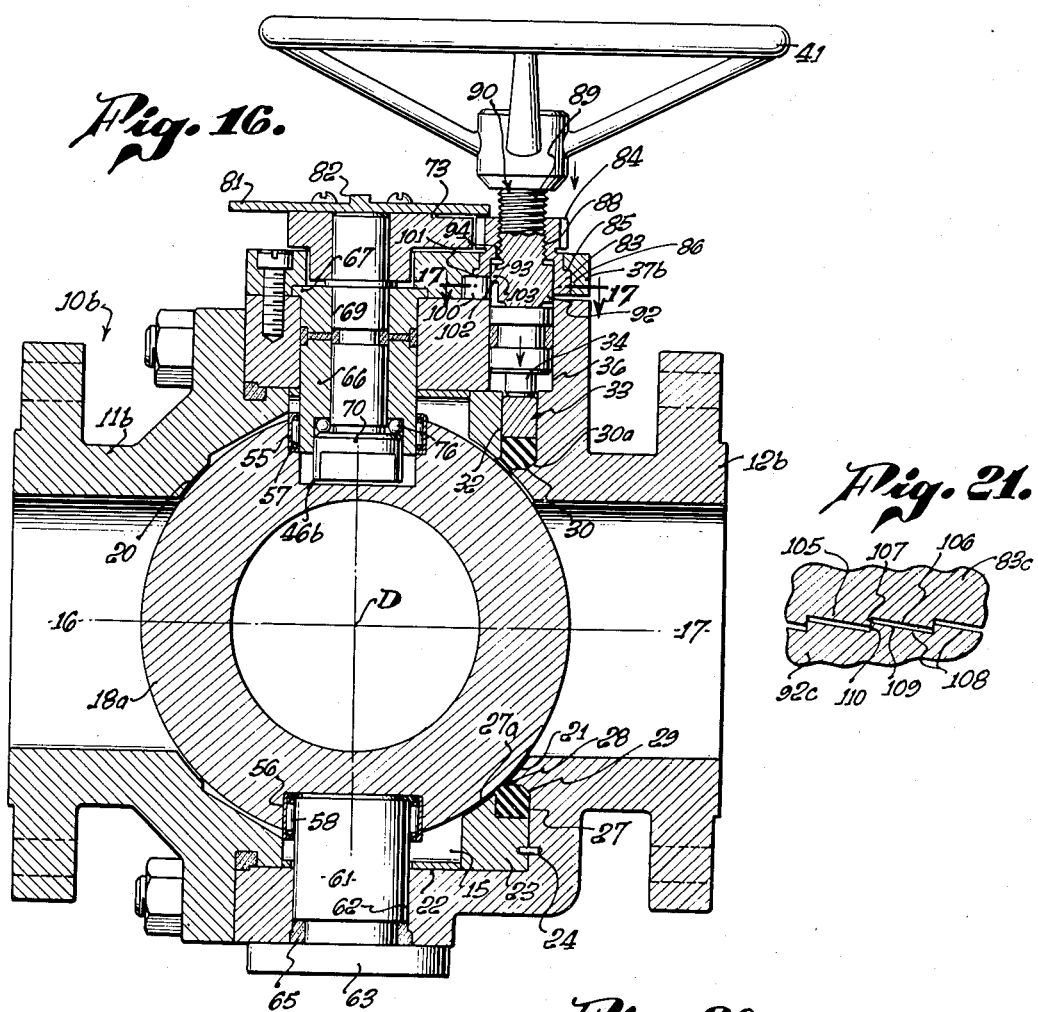

United States Patent Office 2,734,715
Patented Feb. 14, 1956

2,734,715

SPHERICAL VALVE

Granville S. Knox, Glendale, Calif., assignor to Hydril Company, Los Angeles, Calif., a corporation of Ohio Application December 22, 1952, Serial No. 327,279

14 Claims. (Cl. 251—171)

This invention has to do generally with valves, and is more particularly concerned with valves wherein the final seal between the stopper member and the opposing body member is accomplished by pressurizing a coherent body of internally tenacious plastic material extending from member to member.

As a matter of definition to be applied hereinafter, by the terminology "coherent body of internally tenacious plastic material" or the shorter terminology "plastic," I mean a body of plastic material which flows under pressure with relatively great resistance to loss of internal bond between particles, and which acts in the manner of a fluid in the transmission of pressure. For instance, within the defined terminology I include natural or synthetic rubber or internally bonded or vulcanized fibrous material, as distinguished from semi-solids such as heavy grease or putty.

In my copending application entitled "Valve," filed May 16, 1950, Serial No. 162,311, I have shown and described valves of the above general type and what I have said there by way of general structure, operation and advantages apply here also.

In the present application, I have shown a specific type of valve which differs from the types shown in the aforesaid application in that the stopper member is of generally spherical shape and it is merely rotated about one of its axes to aline or disaline its through-port with the flow passages of the body member to establish the open and closed positions of the stopper. The provision of the stopper in spherical form has a number of obvious and distinct inherent advantages, not the least of which is the overall compactness of the valve, as distinguished from the gate type valve where the stopper member must be shifted axially to and from closed position. As distinguished from the tapered or conical type of stopper, all difficulties of the "wedging" effect are avoided.

After the spherical stopper has been moved to closed position, the final seal is accomplished by pressurizing the ring of plastic material which is accommodated in a channel sunk in the opposed face of the body member, the pressurized plastic sealing tightly on the stopper surface about the mouth of the through-passageway. Before the stopper is moved back to open position, the plastic is depressurized. Thus, in moving the stopper to and fro, the plastic sealing member is not subject to wear, and the arrangement is such that differential fluid pressures existing within the valve are not effective to dislodge the packing from the groove, all to the end that the resulting advantages spoken of in the aforesaid application are present.

The valve is adapted for many uses; for instance, it may be used either as an ordinary flow control device, or as a "blind" valve. It is particularly well adapted for the control of fluid containing abrasive particles, such as "drilling mud," for since the final seal is made by the plastic material the gritty particles merely embed themselves in the plastic and the scoring of the opposing body surfaces makes no effective difference.

The valve is shown as of two types, one in which the stopper member is mounted for rotation about a fixed axis with positive radial clearance being maintained at all times between the spherical face of the stopper and the opposing faces of the body member (the clearance space being spanned by the plastic when the latter is pressurized) and the other in which the stopper is capable of bodily shifting a slight amount in the direction of the flow passages of the body member when the stopper is in closed position. In the latter case, the stopper is bodily moved against one opposing body-face when the plastic—at the opposite body-face—is pressurized.

I have shown different plastic-pressurizing controls for the two types of valves, but it will be understood that these controls may be inter-changed at will.

The general objects of the invention are to provide a long-lived valve which is capable of effectively controlling fluid flow regardless of pressures and regardless of the condition or nature, within reasonable limits, of the fluid being controlled—a valve which is easily operated regardless of fluid pressures, and one which can be operated with great dispatch in case of emergency. Other objects and features of the invention will be made apparent from the following detailed description, in which:

Fig. 1 is an end elevation, partly in medial section, of one embodiment of the invention, Fig. 2 is a section on line 2—2 of Fig. 1, Fig. 3 is a section on line 3—3 of Fig. 2, Fig. 4 is a view similar to Fig. 2, but showing the valve in full sealing condition, Fig. 5 is a section on line 5—5 of Fig. 2, Fig. 6 is a section through a detached sealing ring.

Fig. 7 is an end elevation, partly in medial section, of another embodiment of the invention, showing the valve fully open, Fig. 8 is a section on line 8—8 of Fig. 7, Fig. 9 is a section on line 9—9 of Fig. 8, Fig. 10 is a fragmentary section on line 10—10 of Fig. 7, Fig. 11 is a fragmentary section on line 11—11 of Fig. 8, Fig. 12 is a section on line 12—12 of Fig. 11, Fig. 13 is a view similar to Fig. 8, but with the valve closed, though unsealed, Fig. 14 is a fragmentary section on line 14—14 of Fig. 13, Fig. 15 is a fragmentary section on line 15—15 of Fig. 13, Fig. 16 is a view similar to Fig. 13, but with the valve fully sealed, Fig. 17 is a fragmentary section on line 17—17 of Fig. 16, Fig. 18 is a view similar to Fig. 17 but showing the positions of the parts during the re-opening of the valve, Fig. 19 is a fragmentary section of the interlock mechanism, showing a variation thereof, Fig. 20 is a section on line 20—20 of Fig. 19; and Fig. 21 is a fragmentary, developed section on line 21—21 of Fig. 20.

The body or housing 10 of the valve is made up of sections 11 and 12, with their attachment flanges 11a and 12a, respectively, which are bolted together at 13 and gasketed at 14. The housing defines a central valve chamber 15 to which the diametrically opposite flow passages 16 and 17 open. The passages and chamber thus have a common axis A, though it will be understood that the axial alinement of passages 16 and 17 are not essential to the invention, considered broadly.

The valve stopper 18 is constructed of a sphere or ball through which is provided an axial through-passage 19. Passage 19 is of the same diameter as passages 16 and 17 and the axis B thereof is coincident with axis A when the valve is fully open and is normal to axis A when the valve is fully closed. Surrounding the inner end of passageway 16 is an annular seating face 20 which is preferably of substantially spherical curvature and is substantially complementary to the spherical face of stopper 18. A similar face 21 is provided at the inner end of passageway 17. However, it is not essential that the curvature of faces 20, 21 and 27a be exactly spherical and the broader claims are to be read with this reservation in mind.

Body section 12 is provided with a cylindrical bore 22 which accommodates a retaining ring 23, the latter being held against rotational dislodgement by dowel 24. A sleeve 25 in bore 22 is end-pressed by shoulder 26a of section 11 against ring 23, thus snuggly holding said ring against shoulder 26 of section 12. The ring 23 has a face 27a of spherical curvature similar to face 21, but the ring is cut away to define, with the opposite walls of section 12, an annular channel 27 having an annular mouth 28 opposed to stopper 18. Preferably, the portion 29 of the defining wall of the channel is beveled, this beveled portion lying opposite mouth 28 in the direction of axis A.

Snuggly fitted within channel 27 is a pre-formed (as by molding) plastic ring 30. More specifically described, ring or annulus 30 is made up of extrudable, internally tenacious plastic material such as rubber, natural or synthetic, or internally bonded or vulcanized fibrous material such as is used in packing valve stems. Preferably, the plastic material is resilient. I have found, for instance, that a synthetic rubber such as "Hycar" of a durometer hardness of 50 to 55, is particularly well suited to the purpose.

Annulus 30, when pre-formed, is shaped substantially to fit channel 27, the inner corners being symmetrically beveled at 30a and 30b. Bevel 30a fits against bevel 29, while bevel 30b is preferably radially inset from faces 21, 27a when the annulus is unpressurized (Fig. 2). In other words, bevel 30b preferably does not extend through mouth 28 until the plastic is pressurized, thus leaving a space 31 between the ball 18 and the plastic during periods when the ball is being rotated to and from open position.

A slot or way 32 is cut through ring 23 at a point in line with channel 27 (Figs. 2 and 5) the slot accommodating a segmental, metal pressure block 33, the under face 33a, of which engages a portion of the outer periphery of plastic annulus 30. Supported by section 12 and in axial alinement and engagement with block 33 is a pressure plunger 34. This plunger is threadably taken at 35 in housing bore 36, being held in assembly by the ring-cap 37 which is bolted at 38 to the housing. The upward limit of plunger-movement is established by the contact of plunger shoulder 40 with cap shoulder 39 (Fig. 2) and when this condition prevails the annulus 30 is unpressurized.

As a means for threading plunger 34 downwardly, and thus pressurizing annulus 30 through block 33, or for threading the plunger upwardly and thus relieving the pressure on the annulus, I provide a hand wheel 41 which is keyed at 41a to said plunger. The threaded section 35 of the plunger is interrupted by an annular channel 42 adapted to receive plastic packing through a pressure fitting 43.

Cut in the upper surface of ball 18 is a chordal way 44 which lies in a plane parallel to axis A and is, lengthwise, of right angular extension with respect to axis B of ball 18. In other words, way 44 extends crosswise with respect to the longitudinal extent of passage 19. The purposes of these way-characteristics will be set forth later.

A centrally located valve stem 45 is rotatably mounted in section 12 and carries at its lower end, and within chamber 15, a T-head 46, the sleeve 25 being apertured at 47 to permit the passage and rotation of the head. The vertical leg 46a of the head is taken within way 44 in a manner whereby stem rotation causes coincident rotation of ball 18. However, with respect to stem 45, the ball is capable of very limited horizontal movement in the direction of axis A and of very limited vertical movement, for a purpose to be explained.

Keyed to the upper end of stem 45 is an operating lever 48 having a hub 49 from which extend the stop lugs 50 and 51 which are spaced 90° apart. When stop lug 51 engages the housing-supported stop pin 52, the stopper 18 is in valve closing position (Figs. 2 and 4) with passageway 19 completely out of register with passages 16 and 17. When the stem is rotated counter-clockwise (Fig. 3) until lug 50 engages pin 52, the stopper 18 will have been rotated through 90° and passageway 19 will be in full register with passageways 16 and 17—thus putting the valve in full open position.

A channel 53 in stem 45 is supplied with plastic packing through a pressure fitting 54.

To explain certain relative conditions, it may be assumed that the actual radius of the illustrated stopper ball is about 2.5″ and the other parts in the same proportion, though this is in no way to be considered as limitative on the invention. On the other hand, the centers of curvature of faces 20, 21 and 27a are horizontally and oppositely offset a slight amount (about .005″) with relation to center D of chamber 15. That is, referring to Fig. 2, the center of curvature of face 20 is on axis A, but is about .005″ to the left of center D; while the common center of curvature of faces 21 and 27a is on axis A, but about .005″ to the right of center D. The extents of offset of these centers of curvature from center D are so slight that it is impracticable to indicate them on the drawings.

Assuming the valve is in the condition of Fig. 2 and that no fluid pressure is applied against the stopper 18 it will be seen that the stopper will drop down onto the lower portions of said faces, developing clearance C between the upper portions of said faces and the stopper. The radial extent of the clearance is exaggerated in the drawings, but the ball stopper may be considered as having limited "floating" capacity between the opposed annular faces.

Assuming the various parts are in the positions of Fig. 2, it will be seen that the valve stopper 18 may be freely and easily closed and reopened by actuation of lever 48 and that there will be no wear or extrusion of plastic 30. The valve so far described is designed for use with relatively low pressure lines and therefore the pressure of the loose-fitted ball against faces 20, 21 and 27a (depending upon the direction of fluid flow) will not be sufficiently high to resist relatively easy turning of the stopper even though the valve be nearly or fully closed.

Assuming the valve is in the condition of Fig. 2 and that it is desired to effect a full, sealed, shut-off, hand wheel 41 is rotated to depress pressure plunger 34, thus forcing pressure block 33 downwardly and pressurizing plastic annulus 30. This causes an extrusion of plastic material through mouth 28 and into engagement with the stopper 18, ultimately moving the stopper into full engagement with face 20 and developing a clearance between the stopper and faces 21, 27a (Fig. 4). Of course, if the plastic is unpressurized, the "floating" ball may be "centered" by reason of a velocity head, if any.

Sufficient additional pressure is applied to the plastic to set up a metal-to-metal seal at face 20 and a plastic-to-metal seal at the opposite side of the ball. This accomplishes a fluid tight seal and thus effects a full valve shut-off so that no fluid may flow from passageway 16 to passageway 17 or vice versa.

Even though the meeting metal surfaces of the stopper and body member are scored or untrue, the valve will be fluid tight for the plastic material will take up any unequalities. The plastic seal is the main or more positive seal and, in fact, normally is self-sufficient. Even relatively large particles of foreign solids in the fluid do no harm for, if they are in the path of the plastic as it is being extruded, they will simply become embedded in the plastic mass.

When it is desired to re-open the valve, plunger 34 is backed out to relieve the pressure on block 33, whereupon the plastic is depressurized and, due to its inherent resiliency, will back into channel 27 to reoccupy the position of Fig. 2. Thereupon the stopper 18 is freed for easy rotation back to fully open position by swinging lever 48 to such extent that lug 50 engages pin 52.

Fig. 7 and the figures related thereto illustrate a variation which is especially well adapted for installation in high pressure lines, for, even though the line pressure becomes exceedingly high, the valve may still be opened and closed with comparatively great ease. This is largely due to the fact that the ball stopper is mounted on roller bearings and has no metal-to-metal contact between the ball and the body member at any stage of ball movement or rest. The embodiment to be described has other features of advantage over the previously described form, which advantages will become apparent as the description develops.

Many of the parts are similar to corresponding parts of the valve just described. They have been given the same reference numerals and the previous description of their nature and operation will apply here, with certain exceptions to be noted. Here, the spherical stopper 18b is not of the "floating" type previously described, but is mounted for rotation about the fixed axis E which passes through the center D of valve chamber 15. The stopper is provided with diametrically opposite sockets 55 and 56 into which are press-fitted the bearing roller assemblies 57 and 58, respectively. The bearing balls 59, confined in the through-sockets 60 in sleeve 25, engage ball 18a and the wall of bore 22 at angularly spaced points to keep said ball vertically centered.

Entered in bearing relation with roller-assembly 58, is the stationary stud shaft 61 which extends through bore 62 in housing section 12. Stud head 63 is bolted to the section at 64 and the stud is packed off at 65.

Entered in bearing relation with roller-assembly 57 is the stationary stud shaft 66, whose upper, headed end 67 is clamped to housing section 12 by cap 37b. Stud shaft 66 is tubular and has a counterbore 68. Rotatably mounted in the main bore 69 of the shaft is valve stem 45b, the counterbore 68 taking the cylindrical portion 70 of T-head 46b, which is integral with stem 45b. The lower end 71 of head 46b is of non-circular cross section and fits within a substantially complementary subsocket 72 (Fig. 10) sunk in ball 18b at the bottom of socket 55. Accordingly, rotation of stem 45b causes coincident rotation of stopper ball 18b.

A gear segment 73 is keyed at 74 to stem 45b and is held against relative axial movement with respect to the stem by set screw 75. Ball bearings 76 are interposed between the top of head 46b and the opposite defining wall of counterbore 68. Upstanding from cap 37b are angularly spaced stop pins 77 and 78 which extend into the plane of segmental gear 73. The ends 79 and 80 of the segment are adapted to engage pins 77 and 78 to establish the limit of rotative movement of stopper 18b. When the valve is full open (Figs. 7 and 8) stop shoulder 79 engages pin 77, and when the valve stopper is in closing position (whether or not sealed off) stop shoulder 80 engages pin 78 (Fig. 15). Screwed to the top of gear segment 73 is an index plate 81 carrying an integral, raised arrow 82 which parallels axis B of stopper passageway 19. Thus, the arrow gives an external indication of the position of passageway 19, for it extends in the direction of the main horizontal axis of the valve when the valve is fully open, and extends crosswise thereof when the valve is fully closed.

It will be noted that, in all positions of ball stopper 18b, there is radial clearance between the stopper and the faces 20, 21 and 27a, the clearance being about from .005" to .008" when the valve is of the size noted above.

Thus, there is at no time an opportunity for wear such as may exist when there is metal-to-metal contact between the stopper and housing, nor is there a "drag" resisting stopper rotation. In this variational form, the annular face 20 may sometimes be omitted, although it has advantage in that it induces stream line flow between the ball and housing and thus causes the more efficient "sweeping" of foreign solids in the fluid stream. In other words, the extent of clearance between the ball and surface 20 is not critical and may be a great deal more than is indicated.

On the other hand, the extent of clearance between the ball 18a and faces 21, 27a remains important and is maintained to be about from .005" to .008", though these specific dimensions are not to be considered as limitative on the broader aspects of the invention. It is not essential that faces 21, 27a be of exactly spherical curvature nor complementary to the spherical face of ball 18a. They may, for instance, have a much larger radius of curvature or even be of conical characteristics, so long as the ball is capable of free rotation with respect thereto and so long as the effective clearance between the faces and the ball is sufficiently restricted to allow the seal-off described.

The nature of the packing ring 30 and its shape and positional relationship to other elements are the same as previously described, it being noteworthy that exposed bevel 30b is below faces 21, 27a (or, expressed otherwise, below mouth 28) when the plastic is unpressurized. On the other hand, when the valve is closed and the plastic is pressurized (Fig. 16) the plastic extrudes through mouth 28 into pressural and fluid tight or sealing engagement with ball 18a.

I have provided novel means for controlling the pressurization and depressurization of plastic 30, as accomplished by the operation of pressure block 33 and pressure plunger 34, both of which are similar to the corresponding elements of the previously described valve. This means includes an interlock between the plunger operating mechanism and the ball-rotating mechanism, and involves a lost-motion connection, all as will be described. The interlock is such as to force certain operations to be in predetermined sequence. Thus, assuming the valve to be wide open, the valve ball must be rotated to fully closed position before the plastic 30 can be pressurized, though the operator accomplishes the sealing by merely continuing the movement whereby he initially rotated the ball. On the other hand, in opening the valve, a continuous movement by the operator first allows the plastic to be depressurized and then, and only after the plastic is unpressurized, rotates the ball to fully open position. It is thus impossible for the operator to rotate the ball in either direction so long as the plastic is pressurized—insuring that there is no drag on the ball to retard its movement and no rotational wear on the exposed portion of the plastic.

Mounted for rotation in cap 37b, is the cylindrical hub 83 of pinion 84 (Figs. 8, 11 and 12) the hub being coaxial with plunger 34 and being held against upward displacement by cap-shoulder 85. The hub may be considered as a nut member mounted for limited rotation within cap-bore 86 into which opens a detent-release notch or way 87 which is approximately semi-circular as viewed in plan. Pinion 84 and its integral hub 83 are tubular, the threaded bore 88 taking the threaded portion 89 of the operating shaft 90, and the counter-bore 91 taking the generally cylindrical head 92 which is integral with said shaft. The upward threaded movement of the shaft is limited by the engagement of head-shoulder 93 with counter-bore shoulder 94 and, in this position, the head is exerting no effective downward or plastic-pressurizing force on plunger 34 or pressure block 33. Cut through the wall of hub 83 is a radially extending detent-retaining slot 95 which, at times to be later described, registers with notch 87. Sunk in the peripheral face of head 92 is an arcuately extending way 96 which defines an arcuate dwell 97 concentric with the head, and curved terminal shoulders 98 and 99. A cylindrical detent 100 is entered in and, at times, is adapted to play radially through slot 95. In the position of Figs. 8, 11 and 12, this detent extends into way 96, resting on dwell 97 near shoulder 98. The detent is held against axial displacement between the top of section 12 and the downwardly facing shoulder 101 defining the top of hub-slot 95. It will be noted that the upper defining wall 102 of way 96 is, in the position of Fig. 12, spaced slightly above the top of detent 100. The overhang 103 of the head (that is, the portion of the head 92 which overhangs way 96) is, accordingly, spaced slightly above slot 95 and detent 100, all for a reason to be made clear at a later point in the description.

It will first be assumed that the valve is in the condition of Figs. 8 through 12 (that is, wide open) and that shoulders 93, 94 are frictionally engaged by reason of the last valve opening operation, though, in a later-described variation, such frictional engagement does not occur.

Non-rotatively secured to the upper end of the operating shaft 90 is the hand wheel 41, which is rotated continuously in a clockwise direction (Fig. 9) to first rotate ball 18a to closed position and then to pressurize the packing 30 and thus sealingly engage the ball. As shaft 90 is thus rotated clockwise, the frictional engagement of shoulders 93, 94 tends to rotate the pinion 84 in the same direction. Assuming, for the time being, that the frictional engagement between the shoulders is sufficient to prevent relative rotation between shaft 90 and pinion 84, there will be no relative axial movement between the two and thus no pressurizing effect on plastic 30 will exist. On the other hand, the rotation of pinion 84 will set up coincident counterclockwise rotation of gear segment 73, thus rotating ball 18a towards closed position. When passageway 19 is in full register with passages 16 and 17, segment shoulder 80 will engage stop pin 78 (Fig. 15) and the ball 18a will be positively brought to full rest. The gear ratio is such that when this position is reached by the ball, detent 100 will be in radial alinement with release notch 87. Because, once the segment rotation has been stopped by pin 78, the inter-engagement of segment 73 and pinion 84 prevents further clockwise rotation of pinion 84 and its hub 83, continued clockwise movement of shaft 90 breaks the frictional engagement between shoulders 93, 94, and the shaft continues to rotate while the hub 83 remains stationary. As shoulder 98 engages detent 100, it cams that detent radially outward and into notch 87 (Fig. 14) in which position the detent releasably locks the pinion 84 to cap 37b, but is no longer effective to prevent continued clockwise rotation of shaft 90 with respect to pinion 84. Such continued rotation of the operating shaft thus acts to thread that shaft and its head 92 downwardly, thus depressing plunger 34 and block 33 in a manner to pressurize the packing 30 and extrude it into sealing engagement with ball 18a, as indicated in Fig. 16.

Now it will be observed that the spacing of overhang 103 (Fig. 12) above shoulder 101 is sufficient that, during the extent of downward and rotational threaded movement of shaft 90 necessary to close the original gap between shoulder 98 and detent 100 and then to cam the detent into notch 87, the overhand 103 (Fig. 12) will still vertically clear the detent 100 so as not to interfere with the entry of the detent into notch 87. However, as shaft 90 is further rotated to pressurize the packing, as described, overhang 103 descends to a position below the top of detent 100 (Figs. 16 and 17) preventing the detent from re-entering way 96 until the operating stem is subsequently reversely rotated to put the parts back into the positions of Fig. 14.

It was assumed that the frictional engagement between shoulders 93, 94 was sufficiently tight to cause coincident rotation of shaft 90 and pinion 84 until segment rotation is stopped by engagement of shoulder 80 with stop pin 78. In some cases the forces may be such that shoulders 93, 94 will be disengaged early in the valve-closing stage. In such event, shoulder 98 will almost immediately engage detent 100 and, since the detent is held against outward radial displacement at this time (Fig. 11) said shoulder will, through detent 100, positively rotate hub 83 and pinion 84 until the pinion is brought to a halt and detent 100 registers with notch 87.

When it is desired to re-open the valve, the hand wheel 41 and its shaft 90 are rotated in a counterclockwise direction (Fig. 15). Since pinion 84 and cap 37b are still locked by detent 100, such shaft rotation threads the shaft 90 upwardly and thus progressively releases the pressure on plunger 34, pressure block 33 and plastic 30—thus unsealing the valve. When the plastic is resilient, it inherently resumes the condition illustrated in Fig. 8.

During this upward movement of shaft 90 and head 92, the body of the head 92 and overhang 103 prevent the detent from moving radially inward and thus unlocking pinion 84 from cap 37b until packing 30 is fully unpressurized. Then, and only then, the shaft 90 reaches the position of Fig. 14, in which position way 96 is re-registered with the detent 100, overhang 103 is above the detent, and shoulders 93, 94 are frictionally re-engaged. Hence, further counterclockwise rotation of shaft 90 imparts coincident rotational force to pinion 84, the defining face 104 of slot 95 camming detent 100 out of notch 87 and into way 96 (Fig. 18) to unlock the pinion from cap 37b and thus allow rotation of the pinion. Continued counterclockwise rotation of shaft 90 acts through pinion 84 and segment 73 to rotate ball 18a back to the full open position of Figs. 7, 8 and 9. When this position of the ball is reached, the interlock parts will be in the positions shown in Fig. 11.

In some instances it is desirable positively to prevent any frictional engagement between the hub 83 and head 92 such as has been described as existing between shoulders 93, 94 when the parts are in the positions of Fig. 11, thus avoiding the necessity of breaking the "jamb," created by that engagement, during the closing part of the cycle. The variation illustrated in Figs. 19 to 21 accomplishes that end. These figures illustrate the parts in the positions they will occupy at the end of the valve re-opening cycle, that is, detent 100 is in the position it occupies in Fig. 11.

The hub 83c, instead of having a square cut face 94, is cut to have arcuate, depending teeth 105 made up of inclined faces 106 and square cut shoulders 107, the angle of faces 106 being the same as the angle of threads 89. The upper end of head 92c is similarly cut to form opposing teeth 108 having inclined faces 109 of the same angle as the thread angle, and square-cut shoulders 110.

During counterclockwise, or valve-closing, rotation of shaft 90 it is the square cut shoulders 110 of head 92c that engage the square cut shoulders 107 of hub 83 to rotate pinion 84 and segment 73 back to valve-open positions.

The inclined faces 106 and 109 are so cut that when square shoulders 107, 110 are thus engaged at the end of the valve-opening cycle, said inclined faces are spaced vertically apart, as clearly shown in Fig. 21. Thus there is no frictional engagement between opposed end shoulders of hub 83 and head 92 and therefore no effective resistance to relative movement between those members during closing movement of the valve. Thus clockwise movement of shaft 90 is imparted to pinion 83 solely through shoulder 98 and detent 100.

While I have illustrated and described preferred embodiments of my invention, various changes in design, structure and arrangement may be made without departing from the spirit and scope of the appended claims.

I claim:

1. In a valve, a body defining a valve chamber, there being at least a pair of flow passages extending from the exterior of the body and opening to the valve chamber at angularly spaced points, a generally spherical stopper mounted in the chamber for rotation about one of its axes, said stopper having a through passage which, in one adjusted position of stopper-rotation, registers with said flow passages and, in another adjusted position of stopper-rotation, is out of register with at least one of said flow passages, means for rotating the stopper, an annular body-face around the valve-chamber-end of one of the flow passages, there being an annular channel in said body and having an annular mouth opening to said body-face, said mouth encircling and being radially spaced from the associated flow passage, a ring of resilient, extrudable, internally tenacious plastic in the channel, there being a way provided in said body and opening to said channel, a displacement member forming a barrier across said way and being movable therethrough, said displacement member being engageable with said plastic and being movable in one direction to effectively pressurize said plastic and in the opposite direction to allow depressurization of said plastic; the plastic, when so pressurized, pressurally and sealingly engaging the defining walls of the channel throughout their extents and being partially extruded through said mouth into pressural sealing engagement with the spherical face of the stopper, and means for selectively moving the displacement member in one direction and allowing it to move in the opposite direction.

2. A valve as in claim 1; wherein said body face is approximately complementary to the spherical face of the stopper.

3. A valve as in claim 1; including interlocking means between said stopper rotating means and said displacement member operating means, whereby said displacement member operating means is inoperative when said stopper is in positions other than that in which its through passage is out of register with said flow passage.

4. A valve as in claim 3; in which said interlocking means includes a gear operated by said stopper rotating means, and a lost-motion connection between said gear and said displacement member operating means.

5. A valve as in claim 1, wherein said mouth is of restricted width with relation to the width of the channel proper.

6. A valve as in claim 1; wherein said mouth is restricted, and wherein said ring is bodily separable from said body; and including a rigid ring separably supported by the body and annularly defining at least one side of the channel, one side of the mouth, and the portion of said annular face which lies adjacent said mouth.

7. A valve as in claim 6; including means detachably holding said last mentioned ring in said defining position.

8. A valve as in claim 7; in which said last named means includes a second rigid ring coaxial with and having one of its ends engaged with said first named rigid ring, the inside diameter of the second rigid ring being greater than that of the first rigid ring, and an annular shoulder on the body engaged with the other end of the second rigid ring, the portion of the body carrying said shoulder being detachable from the remainder of the body.

9. In a valve, a body defining a valve chamber, there being at least a pair of flow passages extending from the exterior of the body and opening to the valve chamber at angularly spaced points, a stopper mounted in the chamber for rotation between passage-opening and passage-closing positions, a shaft rotatably supported in the body and connected to the stopper for rotating it, stop means preventing rotation of the stopper beyond said positions, plastic sealing material within a channel provided in said body, said material having a face exposed toward the stopper, and means for pressurizing said material and thereby extruding it into sealing engagement with the stopper when the latter is in one of said positions, said means embodying a displacement member supported in said body for linear movement and engaged with said material; a nut member rotatably supported by the body, co-acting means between said nut member and said stopper shaft whereby nut rotation rotates the stopper and, when the stopper is held against rotation, the nut member is held against rotation, an operating shaft threaded through the nut and cooperating with the displacement member in a manner whereby, when the nut member is held against rotation, rotation of the operating shaft in one direction depresses the displacement member and rotation of the shaft in the opposite direction allows elevation of the displacement member, and releasable means connecting the nut member and operating member to hold them against relative rotation whereby coincident rotation of the operating shaft and nut rotates the stopper, said last named means being releasable only when the stopper is in one of said positions.

10. A valve as in claim 9; wherein said coacting means comprises intermeshing gears, one on the nut member and one on the stopper shaft.

11. A valve as in claim 9; wherein said releasable means embodies a detent carried by the nut member and enterable selectively in a way provided in the operating shaft and a way provided in the body member.

12. A valve as in claim 11; including also a cam formation on said operating shaft and operable by shaft rotation, when the detent registers with the body way, to shift the detent from the shaft way to the body way.

13. A valve as in claim 12; wherein said cam formation is a defining wall of the shaft way.

14. A valve as in claim 12; including also a formation on the operating shaft movable, prior to the finish of the first pressure applying revolution of the operating shaft, to a position preventing re-entrance of the detent to the shaft way.

References Cited in the file of this patent

UNITED STATES PATENTS

| | | |
|---|---|---|
| 1,738,450 | Ryan | Dec. 3, 1929 |
| 2,032,623 | Lewis | Mar. 3, 1936 |
| 2,039,220 | Heggem | Apr. 28, 1936 |
| 2,224,446 | Penick et al. | Dec. 10, 1946 |
| 2,600,898 | Maxwell | June 17, 1952 |

FOREIGN PATENTS

| | | |
|---|---|---|
| 520,188 | Germany | 1931 |
| 682,227 | Germany | 1939 |
| 953,216 | France | 1949 |